US012524905B2

(12) United States Patent
Moss et al.

(10) Patent No.: US 12,524,905 B2
(45) Date of Patent: Jan. 13, 2026

(54) AIRCRAFT STEERING ANGLE DETERMINATION

(71) Applicant: AIRBUS OPERATIONS LIMITED, Bristol (GB)

(72) Inventors: Ethan Moss, Bristol (GB); Ting Yu Au, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 390 days.

(21) Appl. No.: 18/115,244

(22) Filed: Feb. 28, 2023

(65) Prior Publication Data

US 2023/0274459 A1 Aug. 31, 2023

(30) Foreign Application Priority Data

Feb. 28, 2022 (GB) ...................................... 2202763

(51) Int. Cl.
*G06T 7/73* (2017.01)
*B64D 45/00* (2006.01)
(Continued)

(52) U.S. Cl.
CPC ............ *G06T 7/74* (2017.01); *B64D 45/0005* (2013.01); *G01B 11/26* (2013.01); *G06T 5/70* (2024.01)

(58) Field of Classification Search
CPC ... G06T 7/74; G06T 5/70; G06T 2207/10024; G06T 2207/10028; G06T 2207/20104; G06T 7/60; G06T 7/11; G06T 7/136; G06T 7/90; G06T 2207/10016; G06T 7/12; G06T 7/13; G06T 7/194; G06T 7/73; G06T 7/75; G06T 7/248; G06T 7/337;
(Continued)

(56) References Cited

U.S. PATENT DOCUMENTS 6,404,486 B1 6/2002 Nobis et al.
6,405,975 B1 6/2002 Sankrithi et al.
(Continued)

FOREIGN PATENT DOCUMENTS

CN 110838247 A * 2/2020 ............. G08G 5/025
EP 3 543 086 A1 9/2019
(Continued)

OTHER PUBLICATIONS

Tian Shu et al., "Image Processing-Based Wheel Steer Angle Detection", Journal of Electronic Imaging 22(4), 043005 (Oct.-Dec. 2013), 10 pages.
(Continued)

*Primary Examiner* — Jose L Couso
(74) *Attorney, Agent, or Firm* — Nixon & Vanderhye P.C.

(57) ABSTRACT

A computer-implemented method of determining a steering angle of an aircraft landing gear including: obtaining an input image of the aircraft landing gear; comparing the input image against a plurality of reference images, the plurality of reference images comprising images of the aircraft landing gear at known steering angles; determining a most similar reference image, the most similar reference image comprising the reference image of the plurality of reference images most closely matched to the input image; and determining, based at least in part on the most similar reference image, the steering angle of the aircraft landing gear.

20 Claims, 8 Drawing Sheets

(51) Int. Cl.
*G01B 11/26* (2006.01)
*G06T 5/70* (2024.01)

(58) Field of Classification Search
CPC .... B64D 45/0005; B64D 47/08; B64D 45/00; G01B 11/26; G08G 5/21; G08G 5/51; G08G 5/54; G08G 5/52; G08G 5/55; G08G 5/74; G08G 5/76; B64C 25/34; B64C 25/28; B64C 25/50; B64C 25/00; G01S 17/88; G01S 17/894; G05D 1/0083; G05D 1/0202; G05D 1/0214; G05D 1/0246; G05D 1/0276; G06V 10/245; G06V 10/26; G06V 10/74; G06V 10/754; G06V 10/772; G06V 10/88; G06V 10/469; G06V 10/46; G06V 20/56; G06V 20/64; G06V 20/647; G06V 30/1904; G06V 30/1914; G06V 30/192; G06V 30/194; G06V 30/196; G06V 30/198; G06V 30/199; G06V 40/1335; G06V 40/53; G06V 40/55; B64F 1/0002; B64F 1/10

See application file for complete search history.

(56) References Cited

U.S. PATENT DOCUMENTS

| | | |
|---|---|---|
| 6,722,610 B1 | 4/2004 | Rawdon |
| 6,961,445 B1 | 11/2005 | Jensen et al. |
| 8,042,765 B1 | 10/2011 | Nance |
| 8,712,603 B2 | 4/2014 | Cox et al. |
| 9,047,771 B1 * | 6/2015 | Thoreen ............... G01C 23/00 |
| 9,786,042 B2 | 10/2017 | Venkatesha et al. |
| 10,317,533 B2 * | 6/2019 | Cherepinsky ......... G01G 19/07 |
| 10,365,094 B2 | 7/2019 | Arora et al. |
| 11,010,889 B2 | 5/2021 | Finch et al. |
| 11,391,648 B2 | 7/2022 | Fanton et al. |
| 2008/0285858 A1 | 11/2008 | Weismuller |
| 2015/0002620 A1 | 1/2015 | Shin et al. |
| 2016/0216128 A1 | 7/2016 | Takano et al. |
| 2017/0334578 A1 | 11/2017 | Fleck et al. |
| 2018/0224868 A1 | 8/2018 | Lim |
| 2019/0112070 A1 | 4/2019 | Fink |
| 2020/0070960 A1 * | 3/2020 | Parker ................. G01G 19/07 |
| 2020/0160736 A1 | 5/2020 | Moll |
| 2020/0398975 A1 | 12/2020 | Toda |
| 2021/0020058 A1 | 1/2021 | Moll |
| 2021/0114657 A1 | 4/2021 | Lu et al. |
| 2021/0407129 A1 | 12/2021 | Durand et al. |
| 2023/0094156 A1 | 3/2023 | Au |
| 2024/0043141 A1 | 2/2024 | Hashimoto |

FOREIGN PATENT DOCUMENTS

| | | |
|---|---|---|
| EP | 4 156 121 | 3/2023 |
| GB | 2587416 | 3/2021 |
| WO | 2014127607 A1 | 8/2014 |
| WO | WO 2020/169833 | 8/2020 |

OTHER PUBLICATIONS

Joy Au, et al., "Challenges and Opportunities of Computer Vision Applications in Aircraft Landing Gear", 2022 IEEE Aerospace Conference (AERO), Mar. 5, 2022, 10 pages.
European Search Report EP 23158973.0 mailed Aug. 11, 2023, 12 pages.
Combined Search and Examination Report under Section 17 and 18(3) in GB application GB2202763.5, dated Aug. 22, 2022, 5 pages.
Huang et al., "Measurement of Tire Tread Depth with Image Triangulation", Computer Science, 2016 International Symposium on Computer, Consumer and Control (IS3C), Jul. 4, 2016.
European Search Report EP Application No. 23 158 967.2 mailed May 22, 2024, 7 pages.
Wang et al, "The Study on Tire Tread Depth Measurement Method Based on Machine Vision" Advances in Mechanical Engineering, vol. (4)1-12 (Feb. 19, 2019)(12 pages).
U.S. Appl. No. 18/115,296, Office Action (Jul. 30, 2025)(35 Pages).

* cited by examiner

AIRCRAFT STEERING ANGLE DETERMINATION

RELATED APPLICATION

This application incorporates by reference and claims priority to United Kingdom Patent Application GB 2202763.5, filed Feb. 28, 2022.

TECHNICAL FIELD

The present invention relates to methods of determining a steering angle of an aircraft landing gear, an aircraft controller, a system for determining a steering angle of an aircraft landing gear, a non-transitory computer-readable storage medium and an aircraft.

BACKGROUND

During operation of an aircraft, it may be desirable for a pilot to receive feedback relating to a status of the aircraft or components thereof. This may allow the pilot to make decisions and/or take actions dependent on the status.

SUMMARY

According to a first aspect of the present invention, there is provided a computer-implemented method of determining a steering angle of an aircraft landing gear, the method comprising: obtaining an input image of the aircraft landing gear; comparing the input image against a plurality of reference images, the plurality of reference images comprising images of the aircraft landing gear at known steering angles; determining a most similar reference image, the most similar reference image comprising a reference image of the plurality of reference images most closely matched to the input image; and determining, based at least in part on the most similar reference image, the steering angle of the aircraft landing gear.

The steering angle or information related to the steering angle may be fed back to a pilot to assist in maneuvering an aircraft. For example, when taxiing, the pilot may be informed of the steering angle of the landing gear so as to know how the aircraft is going to move, and/or so as to know whether the landing gear is responding appropriately to a steering command. Determining the steering angle of an aircraft landing using image comparison may enable the steering angle to be determined without any physical interaction with the aircraft landing gear.

Optionally, the method comprises obtaining the input image of the aircraft landing gear using an imaging device. In this way, the steering angle of the aircraft landing gear may be determined in a non-intrusive manner.

Optionally, the at least one imaging device may be used for other purposes in addition to determining the steering angle. For example, the imaging device may be used for determining a rate of extension and/or retraction of the landing gear, and/or for monitoring the landing gear bay for the presence of foreign objects. This may reduce the total number of sensors/devices within an aircraft landing gear or aircraft landing gear bay.

Optionally, determining the most similar reference image comprises utilising a machine learning algorithm.

Optionally, the determining the most similar reference image comprises calculating respective similarity metrics between the input image and each of the plurality of reference images and comparing the similarity metrics to a threshold to determine the one closest to a threshold value indicative of highest degree of similarity.

Optionally, comparing the input image against the plurality of reference images comprises comparing input image pixel values against corresponding reference image pixel values of each of the plurality of reference images.

Optionally, the input image pixel value and the reference image pixel value comprise information indicative of a colour of the input image and the reference image respectively. For example, the pixel values of the input image and the reference image may comprise a red, green and blue component value. When comparing the input image against the reference image, the values and/or relative values of the red, green and/or blue component values may be compared. The reference image which has the most pixels with red, green and/or blue component values in common to the input image may be the most similar reference image.

Optionally, the plurality of reference images comprises a series of images of the aircraft landing gear having between 10° and 0.5° intervals of steering angle between each image. Optionally, the intervals are between 8° and 0.5°, 6° and 0.5°, 4° and 0.5°, 2° and 0.5°, or 1° and 0.5°. This may provide good resolution for determining the steering angle which may help to ensure accurate steering angle determination.

Optionally, the plurality of reference images cover a total range of steering angles of the aircraft landing gear of between 100° and 180°. Optionally, the total range is between 120° and 160° or between 130° and 150°. For example, the range of steering angles may be from −70° to +70° relative to neutral, i.e. relative to when the landing gear steering angle is at 0° and enables the aircraft to travel in a straight line along the ground. This may help to ensure that the full range of steering angles of the landing gear is covered.

Optionally, comparing the input image pixel values against the corresponding reference image pixel values comprises calculating the root mean square deviation (RMSD) between the input image pixel values and the corresponding reference image pixel values.

Optionally, determining the most similar reference image comprises determining the reference image with the smallest root mean square deviation between the input image pixel value and the corresponding reference image pixel value. This may help to provide a quantitative measure of the similarity between input image and the reference images which may make it easier and/or quicker to determine the most similar reference image.

Optionally, comparing the input image pixel values against the corresponding reference image pixel values comprises transforming the input image pixel values into a one-dimensional input image vector, transforming the reference image pixel values into a one-dimensional reference image vector, and determining a cosine similarity between the input image vector and the reference image vector. The cosine similarity may provide emphasis on the structure of the input image and the reference image and may be less prone to differences caused by environmental variations. This may improve the performance and accuracy of the method.

Optionally, the method comprises determining a subset of the plurality of reference images to be compared against the input image and comparing the input image against the subset.

Optionally, the input image is only compared against the subset of the plurality of images. The subset may reduce the number of reference images needed for comparison, which may increase the efficiency of the method.

Optionally, the determining the subset comprises determining the subset based on a previous determination of the steering angle of the aircraft landing gear. For example, the method may determine the subset of reference images with a steering angle close to a previously determined steering angle, as the aircraft landing gear may be expected to be close to the previously determined steering angle.

Optionally, the method comprises determining a region of interest of the image, the region of interest comprising part of the image in which a component of interest of the aircraft landing gear is expected to be located in normal operation, wherein the comparing the input image against the plurality of reference images comprises comparing the region of interest against the plurality of reference images.

Optionally, the component of interest is a component of the aircraft landing gear which moves as the steering angle of the aircraft landing gear changes. As such, the position of the component of interest may be indicative of the steering angle of the aircraft landing gear. Optionally, the component of interest is a tyre. Optionally, the component of interest is a torque link.

Optionally, the method comprises processing the input image to remove background noise from the input image. For example, the method may comprise blurring the input image, such as by applying a smoothing filter to the input image. This may help to prevent background noise undesirably influencing the determination of the steering angle, which may increase the accuracy of the method.

Optionally, the method comprises applying a filter to the input image to greyscale the image. Converting the image to greyscale may help with subsequent image processing steps. For example, a grayscale image allows for the creation of a binary image which can then be used for subsequent image analysis.

Optionally, the filter is applied to greyscale the image before the input image is compared against the reference images.

Optionally, the method comprises performing gamma correction on the input image.

Optionally, the gamma correction is performed before the input image is compared against the reference images. Gamma correction may help to ensure consistency of gamma levels between the input image and the plurality of reference images.

Optionally, the method comprises processing the input image and the plurality of reference images by applying an imaging process to the input image and applying the same imaging process to the plurality of reference images. This may help to reduce variations caused by the external environment, such as lighting conditions, and may improve comparisons between the input image and the plurality of reference images.

Optionally, processing the input image and the plurality of reference images comprises determining a mask to be applied to the input image and the plurality of reference images and applying the mask to the input image and the plurality of reference images. The mask may cover pixels within the input image and the plurality of reference images which are not of interest for determining the steering angle, such as pixels corresponding to the background of the image, such that those pixels may be excluded from the comparison between the input image and the plurality of background images. Determining the mask may comprise comparing the reference images in the plurality of images against each other to determine a difference between corresponding pixels in the plurality of reference images, determining whether the difference is less than a threshold value, and forming the mask from pixels with the difference less than the threshold value. If the difference between pixels is less than the threshold value, this may indicate that there is no change in the pixel between the reference images and the pixel is therefore part of the background (or not of interest for determining the steering angle). The threshold value may be user defined. Masked areas of the images may be morphed and combined to smoothen the mask. The mask may block out the background which is not relevant to the determination of the steering angle. This may increase the speed of the method as fewer pixels within the respective images need to be compared.

Optionally, processing the input image and the plurality of reference images comprises determining a histogram of the input image and a histogram of the plurality of reference images. Optionally, processing the input image and plurality of reference images comprises modifying the input image such that the histogram of the input image matches the histogram of the plurality of reference images. This may further harmonise the input image with the plurality of reference images to improve comparison between the input image and the plurality of reference images. Optionally, processing the input image and plurality of reference images comprises modifying the input image and the plurality of reference images such that respective histograms of the input image and the plurality of reference images match a predefined histogram. Optionally, processing the input image and the plurality of reference images comprises using contrast limited adaptive histogram matching to match the respective histograms of the input image and the plurality of reference images. This may harmonise the input image and the plurality of reference images to improve the comparison between the input image and the plurality of reference images.

Optionally, processing the input image and the plurality of reference images comprises defining a steering region in the input image and the plurality of reference images, the steering region comprising a subsection of the input image and the plurality of reference images that changes when the steering angle of the aircraft landing gear changes, and cropping the input image and the plurality of reference images to the steering region, wherein comparing the input image against the plurality of reference images comprises comparing the steering region of the input image against the steering region of the plurality of reference images. Cropping the input image and the plurality of reference images to the steering region may remove background from the input image and the plurality of reference images, reducing the size of the images to be compared and therefore increasing the speed and/or efficiency of the method.

Optionally, processing the input image and the plurality of reference images comprises blurring the input image and the plurality of reference images. This may smoothen the input image and the plurality of reference images which may improve the performance of the method. Blurring may comprise averaging, Gaussian blurring, median blurring and/or bilateral filtering.

Optionally, processing the input image and the plurality of reference images comprises sharpening the input image and the plurality of reference images. The method may comprise applying a sharpening kernel to the input image to sharpen the input image. This may sharpen edges in the input image to emphasise features in the input image.

Optionally, processing the input image and the plurality of reference images comprises denoising the input image and the plurality of reference images. This may reduce noise within the image to improve the performance of the method.

Optionally, the plurality of reference images is for a given aircraft type. Optionally, the reference images are stored in a memory of the aircraft. Optionally, the reference images are stored on a database accessible by the aircraft.

Optionally, the method comprises providing information indicative of the steering angle of the aircraft landing gear to a crew of an aircraft. Optionally, the method comprises displaying the steering angle of the aircraft landing gear in a cockpit of the aircraft. This may allow the pilot and/or other member of the crew to be quickly and easily informed of the steering angle of the landing gear of the aircraft. The pilot may be informed of the steering angle of the aircraft landing gear even if the aircraft landing gear is not in their direct sight. This may help the pilot with maneuvering the aircraft on the ground. Moreover, the determined steering angle of the aircraft landing gear may be used to limit further movement/rotation of the aircraft landing gear. For example, if the steering angle of the aircraft landing gear is determined to be at a maximum safe steering angle, the pilot may be prevented from increasing the steering angle further. The pilot may also receive a warning or other feedback when the maximum steering angle is reached.

Optionally, the method comprises providing information indicative of the steering angle of the aircraft landing gear to the crew of the aircraft while the aircraft is not on the ground. This information may be used to determine whether the aircraft landing gear is in the correct position/orientation for landing and/or cruise. The aircraft may carry out a pre-land test in which the aircraft landing gear is actuated to turn in the landing gear bay to ensure that it is operating correctly before being extended. The method may comprise provide information indicative of the angle of the aircraft landing gear in the landing gear bay which can be used to confirm whether the aircraft landing gear is operating correctly. This may allow the crew to make an informed decision on whether it is safe to continue with landing and/or continued flight.

Optionally, the method comprises storing the determined steering angle. Optionally, the method comprises storing the determined steering angle on a memory of the aircraft. Optionally, the method comprises storing the determined steering angle on a database accessible by the aircraft.

Optionally, the plurality of references images is generated by capturing images of the aircraft landing gear while receiving information indicative of the steering angle of the aircraft landing gear, and saving the images and the corresponding steering angle to a memory.

Optionally, the information indicative of the steering angle of the aircraft landing gear may be determined by a sensor on the aircraft landing gear. For example, the information indicative of the steering angle may be determined by a rotary variable differential transformer (RVDT).

According to a second aspect of the present invention, there is provided an aircraft controller configured to: obtain an image of an aircraft landing gear; compare the input image against a plurality of reference images, the plurality of reference images comprising images of the aircraft landing gear at known steering angles; determine a most similar reference image, the most similar reference image comprising the reference image of the plurality of reference images most closely matched to the input image; and determine, based at least in part on the most similar reference image, the steering angle of the aircraft landing gear.

Optionally, the controller is configured to receive the image from at least one imaging device.

According to a third aspect of the present invention, there is provided a system for determining a steering angle of an aircraft landing gear, the system comprising: an imaging device; an aircraft controller configured to: obtain an image of an aircraft landing gear from the imaging device; compare the input image against a plurality of reference images, the plurality of reference images comprising images of the aircraft landing gear at known steering angles; determine a most similar reference image, the most similar reference image comprising the reference image of the plurality of reference images most closely matched to the input image; and determine, based at least in part on the most similar reference image, the steering angle of the aircraft landing gear.

Optionally, the imaging device comprises a first imaging device and a second imaging device.

Optionally, the first imaging device and the second imaging device are different types of imaging device. This may help to increase the robustness of the system as the first and second imaging devices may comprise different failure conditions. For example, a situation that may cause the first imaging device to fail to operate correctly may not have the same effect on the second imaging device.

Optionally, the first imaging device comprises a lidar sensor and the second imaging device comprises a camera.

Optionally, the first imaging device comprises a first sensor and the second imaging device comprises a second sensor. Optionally, the first sensor is a camera sensor and the second sensor is a lidar sensor Providing different types of imaging device may allow for different types of data to be captured. For example, a lidar sensor may provide depth information of the image captured. The different types of data may then be used to determine other information about the aircraft landing gear. For example, the depth information from the lidar sensor may be used to determine the depth of the tread of the tyre, so as to determine when the tyre may need replacing.

According to a fourth aspect of the present invention, there is provided a method of determining a steering angle of an aircraft landing gear, the method comprising: determining a condition affecting the aircraft landing gear; selecting, based at least in part on the condition, a first mode of determining the steering angle of the aircraft landing gear or a second mode of determining the steering angle of the aircraft landing gear; and determining the steering angle of the aircraft landing gear using the selected mode.

This may allow the best mode of operation for the given condition to be selecting. As such, this may improve the accuracy of the method.

Optionally, the first mode and the second mode are different first and second methods of determining the steering angle of the aircraft landing gear.

Optionally, the condition is a condition affecting the determination of the steering angle. Optionally, the condition is a weather condition. Optionally, the condition is an operation status of an imaging device.

According to a fifth aspect of the present invention, there is provided a method of determining an aircraft steering angle, the method comprising: obtaining image information of an input image of the aircraft landing gear; comparing the image information of the input image against a database of image information of the aircraft landing gear at known steering angles; and determining, based at least in part on the image information of the aircraft landing gear at known steering angles, the steering angle of the aircraft landing gear.

According to a sixth aspect of the present invention, there is provided a non-transitory computer-readable storage medium storing instructions that, when executed by an aircraft controller, cause the aircraft controller to carry out the method according to the first aspect of the present invention, the fourth aspect of the present invention or the fifth aspect of the present invention.

According to a seventh aspect of the present invention, there is provided an aircraft comprising the aircraft controller according to the second aspect of the present invention, the system according to the third aspect of the present invention, or the non-transitory computer-readable storage medium according to the sixth aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
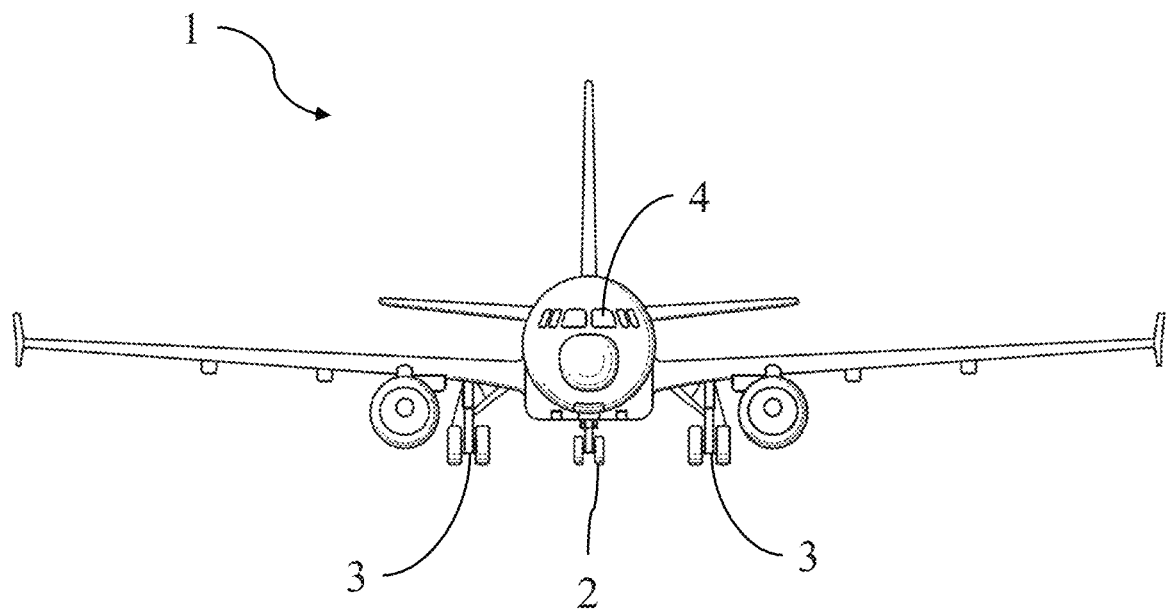
FIG. 1 shows a schematic view of an aircraft.

FIG. 1 shows a schematic view of an aircraft 1 according to an example. The aircraft 1 comprises a nose landing gear 2 and two sets of main landing gear 3. During movement of the aircraft 1 on the ground, the angle of the nose landing gear 2 can be adjusted to alter the trajectory of the aircraft 1 (i.e., to turn the aircraft 1). In some examples, the angle of the main landing gear 3 is also adjusted to aid movement of the aircraft 1 on the ground. The aircraft 1 comprises a cockpit 4 from which a member of the flight crew, e.g., a pilot, controls the aircraft. The cockpit comprises an interface, e.g., a joystick or dial, to control the steering angle of the nose landing gear 2.

Figures 2, 3:
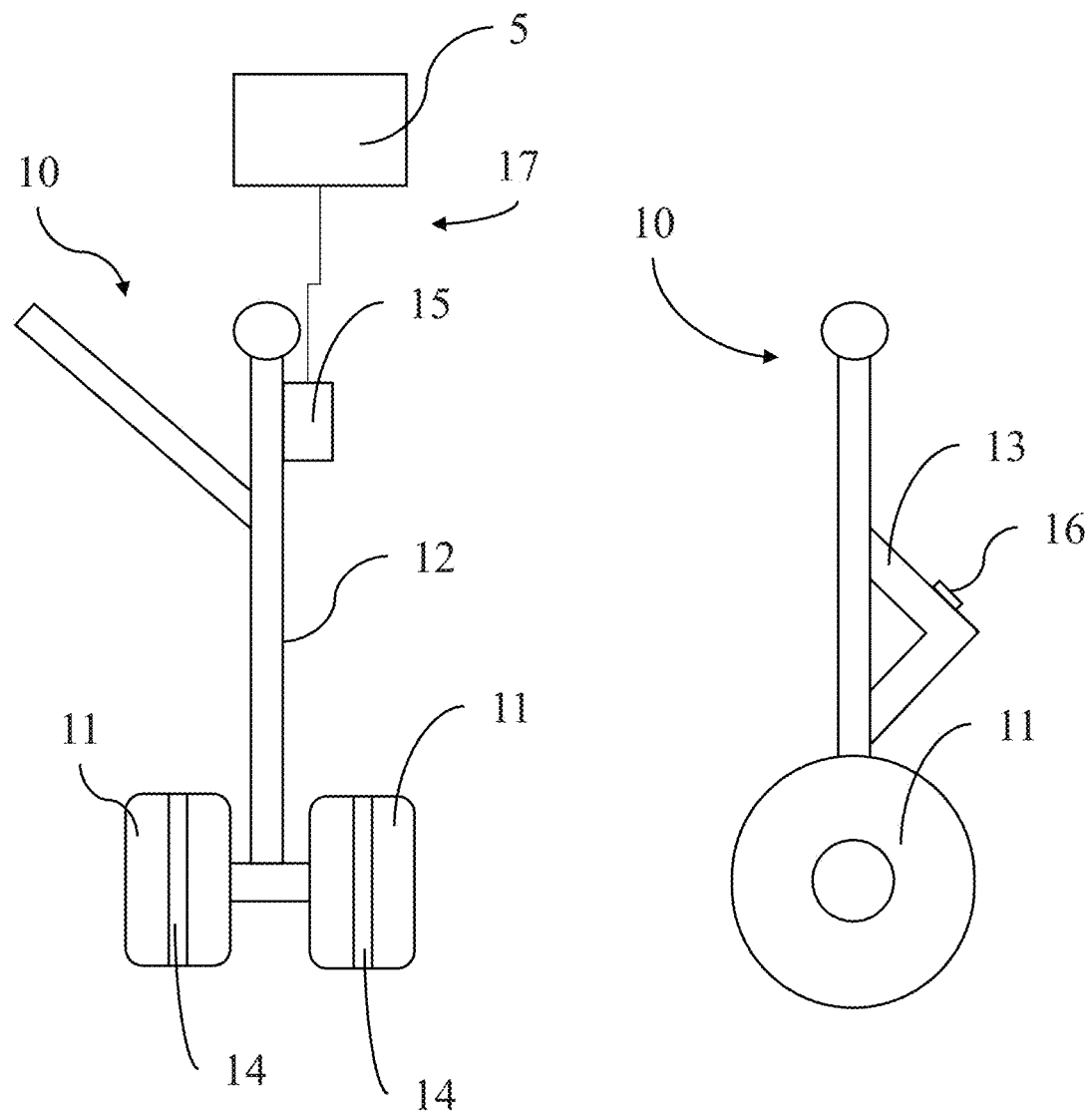
FIGS. 2 and 3 show schematic views of an aircraft landing gear.

FIGS. 2 and 3 show a schematic front and side view of an aircraft landing gear 10 respectively. The aircraft landing gear 10 shown in FIGS. 2 and 3 is the nose landing gear 2 of FIG. 1. In other examples, the aircraft landing gear 10 is the main landing gear 3 of FIG. 1. The aircraft landing gear 10 comprises two tyres 11, a strut 12 and a torque link 13. Each of the tyres 11 comprises a tread 14. The aircraft landing gear 10 is configured to be retracted and stored in a landing gear bay during flight, and to be extended for take-off and landing.

Also shown schematically in FIG. 2 is a system 17 for determining the steering angle of the aircraft landing gear 10. The system 17 comprises an imaging device 15 and an aircraft controller 5. The imaging device 15 is provided on the strut 12 of the aircraft landing gear 10 and captures images of the aircraft landing gear 10. The imaging device 15 is positioned on the strut 12 so as to be directly above the tyre 11 when the landing gear 10 is extended. In some examples, the imaging device 15 is located in another location, for example on another part of the aircraft landing gear 10 or on another part of the aircraft 1 which is in view of the aircraft landing gear 10. The imaging device 15 shown in FIG. 2 comprises a camera. In other examples, the imaging device 15 may comprise another optical imaging device, e.g. a lidar sensor. In some examples, the imaging device 15 comprises both a camera and a lidar sensor. The aircraft controller 5 of the system 17 is configured to carry out any method of determining the steering angle of the aircraft landing gear 10 discussed herein.

Figure 4:
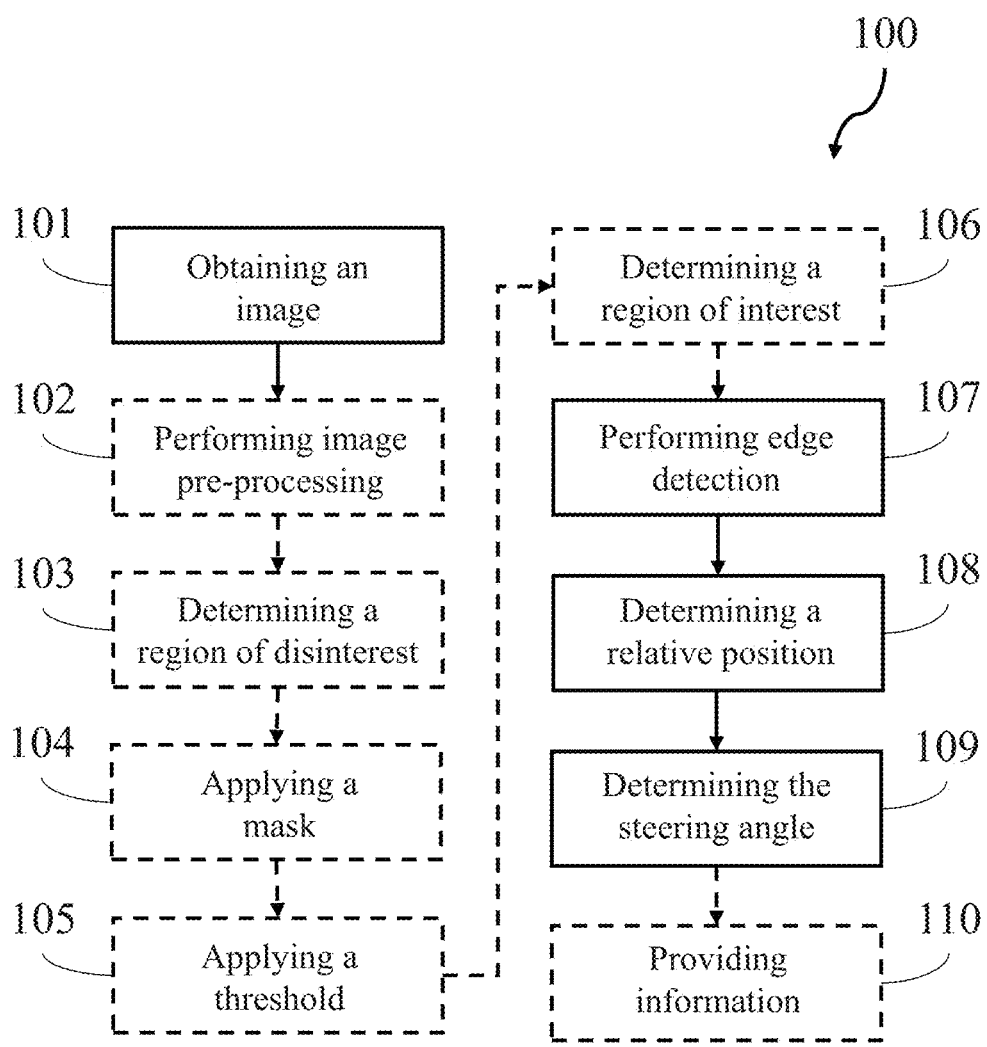
FIG. 4 shows a flow diagram of a method of determining a steering angle of an aircraft landing gear.

FIG. 4 shows a flow chart of a method 100 of determining a steering angle of the aircraft landing gear 10. The method 100 is performed by the aircraft controller 5 and comprises: obtaining 101 an image of the aircraft landing gear 10; performing 107 edge detection on the image; determining 108, based at least in part on an edge obtained by the edge detection, a relative position of a component of the aircraft landing gear 10; and determining 109, based at least in part on the relative position of the component, the steering angle of the aircraft landing gear 10. FIGS. 5a to 5e show schematic views of the image 20 obtained by the method 100.

Figure 5A:
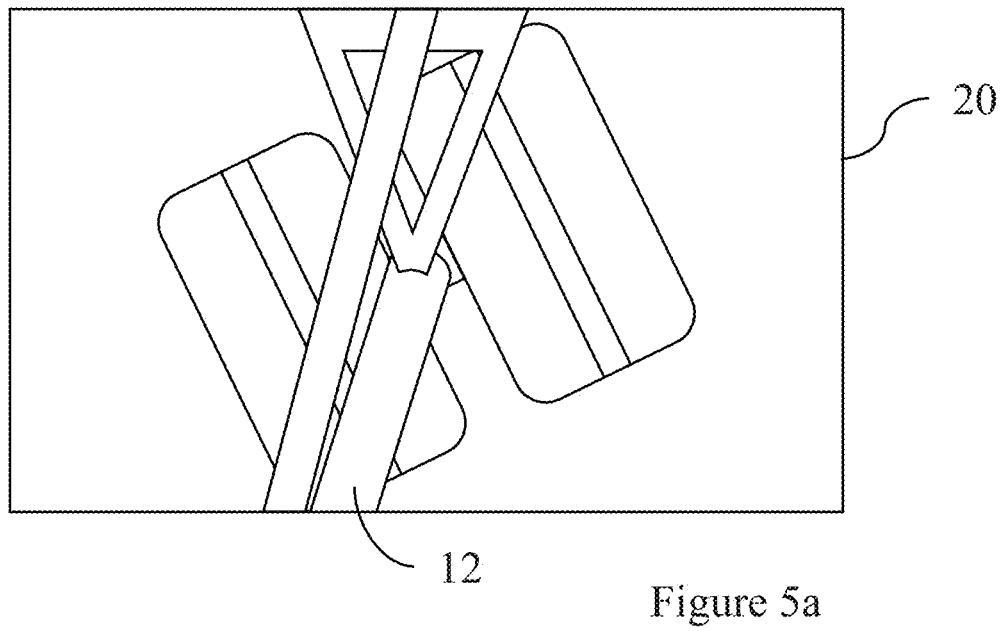
FIGS. 5a to 5e show schematic views of an image of the aircraft landing gear obtained by the method of FIG. 1.

As shown in FIG. 5a, the image 20 includes a view of components of the aircraft landing gear 10. The method 100 comprises determining a relative position of a component of the aircraft landing gear 10 which is used to determine the steering angle. In the image 20, the component comprises one of the tyres 11 of the aircraft landing gear 10 and in particular the tread 14 of the tyre 11. The image 20 shown in FIG. 5a is obtained from the camera 15 positioned on the strut 12 of the aircraft landing gear 10 as shown in FIG. 2. The camera 15 is configured to capture a video of the aircraft landing gear 10 and a single frame of the video is obtained during the method 100 to determine the steering angle. This allows from the continual monitoring of the steering angle of the aircraft landing gear 10. Although the image 20 in FIG. 5a is obtained from the camera 15, in some examples the image 20 is obtained from a memory on the aircraft 1, e.g. where the image 20 has been temporarily stored after previously being captured by the camera.

After the image 20 has been obtained by the aircraft controller 5, the aircraft controller 5 performs the method 100 to perform 102 image pre-processing to the image 20. As shown in FIG. 4, the image pre-processing is applied before any subsequent image processing steps are performed. The image pre-processing includes applying a filter to the image 20 to greyscale the image 20. To greyscale the image 20, each pixel of the image 20 is converted to a shade of grey based on the brightness/luminance of the pixel. Converting the image to greyscale may help with subsequent image processing steps. For example, a grayscale image allows for the creation of a binary image (e.g. through image thresholding) which can then be used for subsequent image analysis.

Performing 102 image pre-processing to the image 20 also includes performing gamma correction on the image 20. The gamma correction may help to correct the brightness level in the image 20 and may improve the subsequent image processing steps. Gamma correction may be applied to the image 20 using a non-linear transformation of the form:

$$O = \left(\frac{I}{255}\right)^{\gamma} \times 255$$

where O is an output pixel value, I is an input pixel value from the image 20 and γ is the gamma correction value. When γ<1 the original dark regions will be brighter and when γ>1 the opposite occurs.

Figure 5B:
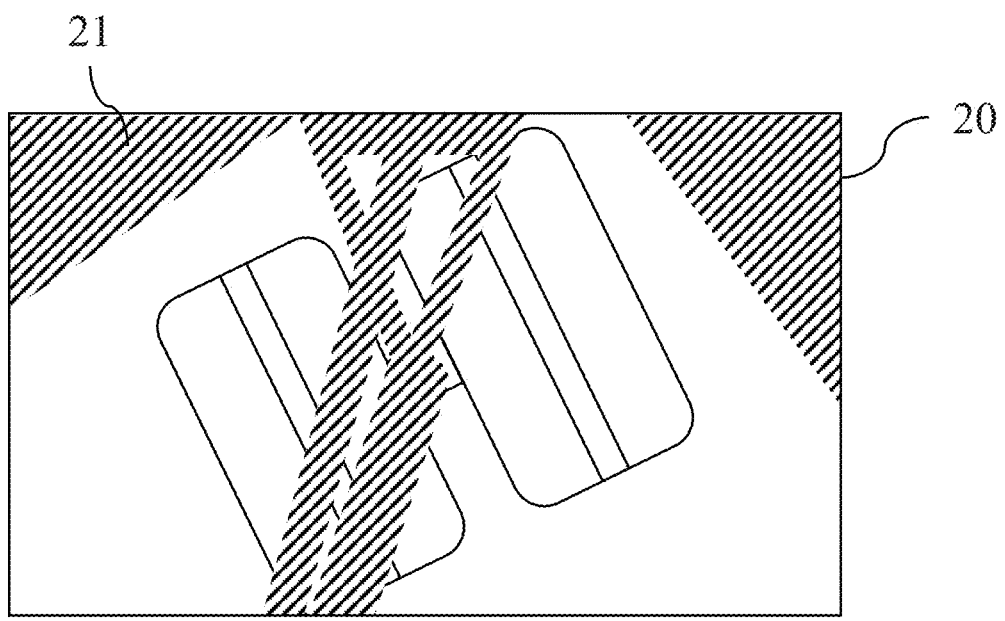

Following performing 102 the image pre-processing, the method 100 comprises determining 103 a region of disinterest in the image 20 and applying 104 a mask 21 to the image 20 to remove the region of disinterest from the image 20. FIG. 5b shows a schematic view of the image 20 after the mask 21 has been applied. In the image 20 shown in FIG. 5b, the mask 21, and therefore the region of disinterest, is indicated by the hatched lines. The region of disinterest includes part of the image 20 in which the tyres 11 are not expected to be present in normal use. For example, in the image 20 of FIG. 5a, the tyres 11 cannot be present in the location of the strut 12. As such, this part of the image 20 is determined to be part of the area of disinterest and the mask 21 is applied to this area (as shown in FIG. 5b). As the tyres 11 are not expected to be in the area of disinterest during normal use, this area is excluded from further analysis which may reduce computational requirements and increase the efficiency of the method 100.

The region of disinterest in FIG. 5b is determined by analysing a series of images of the aircraft landing gear 10 and determining which parts of the image do not vary significantly between sequential images. The series of images are a series of still images taken from the video of the aircraft landing gear 10 captured by the camera 15. It is assumed that any parts of the image which do not vary significantly between sequential images contain components which are substantially static/not moving. As such, these parts of the image are considered less relevant to the determination of the steering angle of the aircraft landing gear 10 and are attributed to the region of disinterest.

To determine the region of disinterest it is determined whether a property of a pixel in one image varies by more than a threshold amount over the corresponding pixel in a subsequent or preceding image. The property comprises a pixel value which may include information such as the colour or intensity of the pixel. If the pixel does not vary by more than the threshold amount, that pixel is determined to be part of the region of disinterest. The threshold amount varies depending on conditions, such as lighting conditions, and can be empirically determined. For example, as the aircraft 1 travels over runway lights, this may affect the relative brightness of sequential images, meaning that a different threshold is required compared to a situation where the lighting conditions are constant. The threshold amount may also vary between different aircraft types. Although the region of disinterest is determined after the image 20 has been obtained in the method 100 of FIG. 4, in some examples the region of disinterest is determined or known before the image 20 is obtained and the mask 21, based on the region of disinterest, is applied after the image 20 is obtained.

Information indicative of the mask 21 and/or region of disinterest is stored on the memory of the aircraft 1 to enable such information to be used in subsequent steering angle determinations. This may allow for quick and easy access to the information, which may increase the efficiency and/or speed of the method 100. In other examples, the information is stored remotely from the aircraft 1, which may allow multiple aircraft 1 to access the information. This may also allow the information to be updated at a central location, rather than having to update the memory of each aircraft 1 individually. For example, the information may be updated if the configuration of the aircraft landing gear 10 is changed or if the position of the imaging device 15 is changed. In some examples, the mask 21 and/or region of disinterest are constant for a given aircraft type.

After performing 102 the image pre-processing and applying 104 the mask to the image, the method 100 comprises applying 105 a threshold to the image 20. Thresholding is a type of image segmentation which changes the pixels of the image 20 to make the image 20 easier to analyse. By applying 105 the threshold to the greyscale image 20, the greyscale image 20 is transformed into a binary image, i.e. a black and white image. The threshold applied to the image 20 replaces each pixel in the image with a black pixel if the intensity of the pixel is less than a threshold value and a white pixel if the intensity is greater than the threshold value. The threshold value is pre-determined and constant for the entire image 20.

The threshold described above uses a pre-determined threshold value which is not dependent on the image 20 being analysed. In some examples, it is desirable to apply a tailored threshold to the image 20 which is better suited to the particular image 20. Such a threshold comprises Otsu thresholding (also known as Otsu's binarization or Otsu's method). Otsu thresholding determines an optimal global threshold from an image histogram. All possible threshold values are iterated and the spread of pixel levels is determined, i.e. the number of pixels that are in the background vs the number of pixels that are in the foreground, with the aim of determining the threshold value which makes these two numbers equal/close to equal.

In some examples, it may be necessary to use a threshold that varies across the image 20, i.e. is not a single constant value across the entire image 20, to account for local lighting inconsistencies. In such examples, an adaptive threshold is used (also known as dynamic and/or local thresholding). Rather than using a single threshold value for the entire image 20, adaptive thresholding calculates a threshold based on a small region around a pixel, which can lead to different threshold values across the image 20. Examples of adaptive threshold which can be used include Mean or Gaussian thresholding. Mean thresholding takes the mean threshold of the pixels surrounding a given pixel, whereas in Gaussian thresholding the threshold value is the Gaussian weighted sum of neighbourhood values (i.e. of the pixels adjacent to the pixel being considered).

Figure 5C:
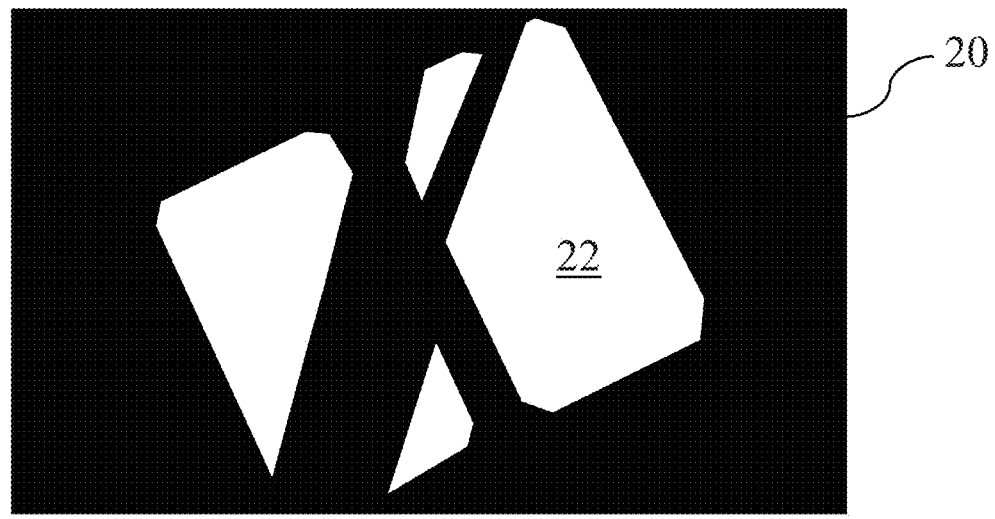
Figure 5D:
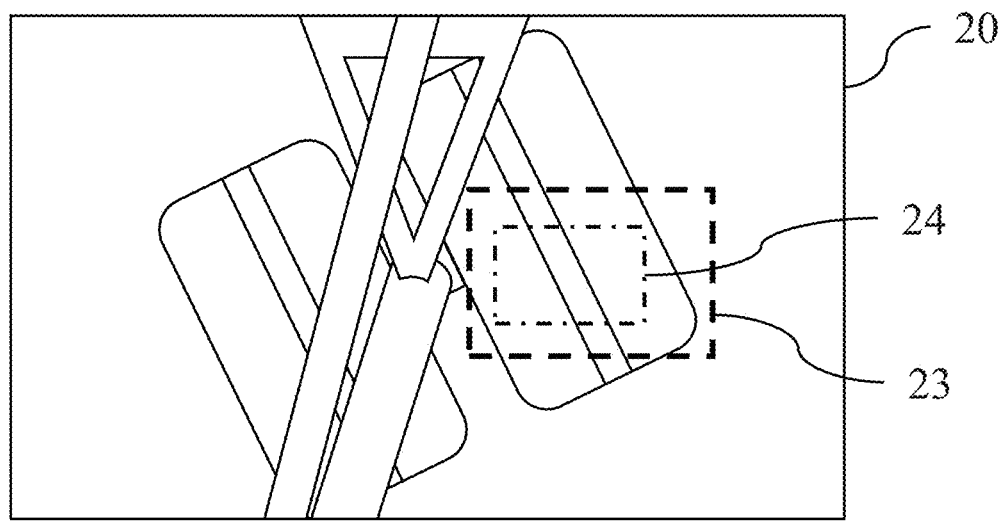

As well as determining the region of disinterest within the image 20 the method also comprises determining 106 a region of interest of the image 20. The region of interest comprises part of the image 20 in which the tyres 11 are located. Determining 106 the region of interest comprises applying contour detection to the image 20. The contour detected image 20 is shown in FIG. 5c. Contour detection enables the identification of borders of objects within an image. In FIG. 5c, the contour detection is performed to locate the tyres 11, or a part thereof, within the image 20. The largest contour 22 that is detected is assumed to be a contour of the tyres 11. As shown in FIG. 5d, the region of interest 23 includes the contour 22 detected in FIG. 5c. Once the area of interest is determined, a smaller portion 24 of the region of interest 23 is selected. This helps to ensure that everything being considered is a part of the tyre 11 and is not a fringe section on the boundary of the tyre 11. The contents of subsection 24 are shown in more detail in FIG. 5e.

Once the portion 24 of the region of interest is selected, the method comprises performing 107 edge detection on the image 20. The edge detection is applied only to the portion 24 identified previously. Edge detection aims to identify edges within a digital image at which the image brightness changes sharply, i.e. where the image brightness is discontinuous. Edge detection processes can generally be grouped into two categories: search-based and zero-crossing based. In search-based methods, edges are detected by first computing a measure of the strength of the edges, e.g. using a first-order derivative expression such as the gradient magnitude, and then searching for local directional maxima of the gradient magnitude using a computed estimate of the local orientation of the edge, usually the gradient direction. In zero-crossing based methods, edges are found by searching for zero crossings (the point where the sign of a mathematical function changes, i.e. the point at which the mathematical function crosses an axis) in a second-order derivative expression, such as the Laplacian, computed from the image. As shown in FIG. 4, performing 107 edge detection occurs after the other image processing steps discussed above have been completed.

Performing 107 edge detection on the image 20 comprises performing Canny edge detection. Canny edge detection is a particular type of edge detection which uses a multi-stage algorithm to detect a wide range of edges in images. Firstly, a Gaussian filter is applied to the image to smooth the image and remove noise. The filter uses a Gaussian function of the form:

$$G(x) = \frac{1}{2\pi\sigma^2} e^{-\frac{x^2+y^2}{2\sigma^2}}$$

where x is the distance from the origin in the horizontal axis, y is the distance from the origin in the vertical axis and a is the standard deviation of the Gaussian distribution.

Next, intensity gradients within the image are found. An edge detection operator (e.g. a Roberts, Prewitt or Sobel operator) is applied to the image to return the first derivative in the horizontal direction ($G_x$) and the vertical direction ($G_y$). From this, the edge gradient G and direction θ can be determined by:

$$G = \sqrt{G_x^2 + G_y^2}$$

$$\theta = \arctan\left(\frac{G_y}{G_x}\right)$$

The edge direction is rounded to one of four angles representing vertical, horizontal, and the two diagonals (i.e. 0°, 45°, 90° and 135°).

Once the intensity gradients have been found in the image 20, a gradient magnitude threshold or lower bound cut-off suppression is applied to the image 20. This is an edge thinning technique which is used to remove unwanted spurious points on the edges of the image 20. Lower bound cut-off suppression is applied to find the locations with the sharpest change of intensity value. The edge strength of the current pixel is compared with the edge strength of the pixel in the positive and negative gradient directions. If the edge strength of the current pixel is the largest compared to the other pixels with the same direction (e.g. a pixel that is pointing in the y-direction will be compared to the pixel above and below it in the vertical axis), the value is preserved. Otherwise, the value will be suppressed.

A double threshold is then applied to determine potential edges and to suppress weak edges. Although the previous edge thinning techniques means that the remaining edge pixels provide a more accurate representation of the edges of the image, some spurious edge pixels may remain. To filter these out, high and low threshold values are selected. If an edge pixel's gradient value is smaller than the high threshold value and larger than the low threshold value, it is marked as a weak edge pixel. If an edge pixel's gradient value is smaller than the low threshold value, it is suppressed. The thresholds selected are dependent on the image being analysed and are empirically determined.

The detection of edges is finalised by suppressing any remaining weak edges which are not connected to strong edges. A weak edge which is associated with a true edge (i.e. an actual edge of an object in the image) is expected to be attached to a strong edge. Therefore, any weak edge which is not attached to a strong edge is likely caused by noise/colour variations and can be suppressed. This is done by looking at a weak edge pixel and its eight connected neighbourhood pixels. As long as there is one strong edge pixel within the connected neighbourhood pixels, the weak edge pixel can be identified as one that should be preserved.

Although Canny edge detection is used in the method 100 of FIG. 4, in some examples, the edge detection may comprise other algorithms. For example, the edge detection may comprise Sobel, Prewitt or Roberts algorithms.

Figure 5E:
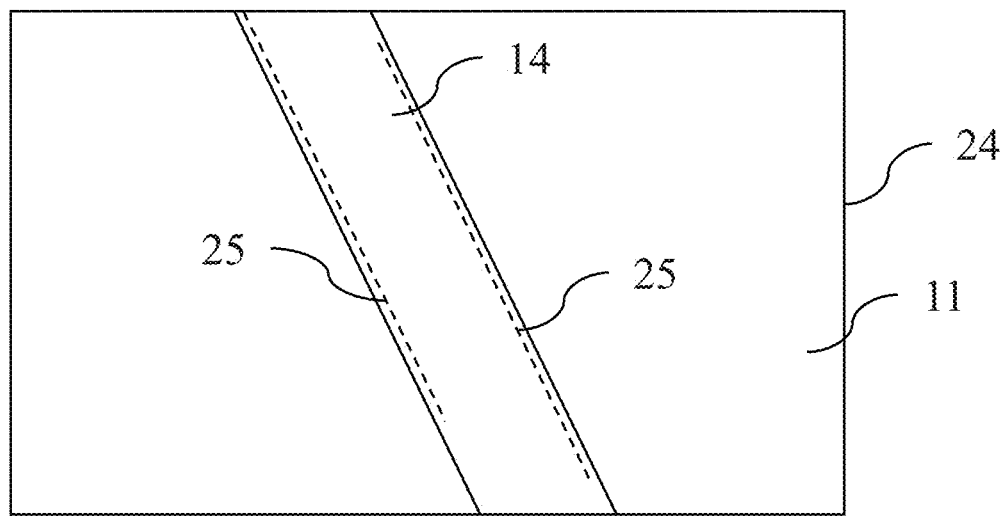

After edge detection has been applied to the image 20, the method 100 comprises determining 108 a relative position of the tread 14 of the tyre 11. Determining 108 the relative position comprises determining an angle of the tread 14 of the tyre 11 relative to the camera. As illustrated in FIG. 5e, the method comprises determining the angle of the tread by applying a Hough transform to the portion 24 to find straight lines (as indicated by dashed lines 25 in FIG. 5e) within the portion 24. The straight lines 25 indicate the edges of the tread 14 and the angle of the lines 25 are indicative of the steering angle of the aircraft landing gear 10.

The Hough transform is a feature extraction technique which is used to identify lines in an image. In polar coordinates, every point on a line can be described using a pair r, θ (also known as Hough space), where r is the shortest distance from the origin to the closest point on the line (approaching the line perpendicularly) and θ is the angle between the x-axis and a line connecting the origin with the closest point on the line. For a given line, specific r and θ values can be determined which satisfy the following equation for each point x, y:

$$r = x \cos\theta + y \sin\theta$$

Each point along a line in the portion 24 of the image 20 can be mapped as a sinusoid in Hough space, while each point in Hough space is mapped as a line in image space. Therefore, a point at which sinusoids intersect in Hough space indicates the presence of a straight line in the image 20.

By applying a Hough transform to the edge detected image 20, a relative angle of the tread 14 of the tyre 11 is determined. The relative angle of the tread 14 is the angle of the tread relative to the camera 15. The method 100 then comprises determining 109 the steering angle of the aircraft landing gear, based at least in part the relative angle of the tread 14 of the tyre 11. Where multiple lines 25 are determined from the Hough transform, a median of the angles of the lines 25 is taken to determine the steering angle of the aircraft landing gear 10. In some example, another central tendency of the angles of the lines 25 may be determined, such as a mean or a mode of the angles of the lines 25. To help to ensure that erroneous line lengths are disregarded (e.g. those too small to be an edge of the tread 14), a predefined limit is applied to ignore such lines. The predefined limit is a minimum length (e.g. minimum number of pixels) for a line to be considered an edge of the tread 14. Any lines below the predefined length are disregarded.

Although the method 100 has been described with relation to the component of the aircraft landing gear 10 being the tyre 11, in some examples the component may be another part of the aircraft landing gear 10. For example, the component may be the torque link 13, where the torque link 13 comprises a reference mark 16 (as shown in FIG. 3). In such an example, the determining 108 the relative position of the component comprises determining, based at least in part on the edge obtained by the edge detection, the relative position of the reference mark 16. Although one reference mark 16 is shown in FIG. 3, in some examples the component the torque link 13 comprises a plurality of such reference marks.

The reference mark 16 may help in determining the position of the torque link 13 relative the imaging device 15. For example, the reference mark 16 may be less susceptible to external influence than the torque link 13 as a whole, e.g. it may be less likely that an external force moves the reference mark 16 in an undesirable/inconsistent way. Therefore, the reference mark 16 may provide a more consistent reference point for determining the position of the torque link 13.

Furthermore, the reference mark 16 is arranged such that it is not occluded from the camera, even when a part of the torque link 13 is occluded from the camera. This may allow the position of the torque link 13 to be determined even when the part of the torque link is occluded. In other examples, the reference mark 16 is omitted and the steering angle is determined based on an edge of the torque link 13 obtained by the edge detection. In some examples, the component comprising the reference mark 16 is another component of the aircraft landing gear, for example a bogie of the aircraft landing gear 10.

After the steering angle of the aircraft landing gear 10 has been determined, the method 100 comprises providing 110 information indicative of the steering angle of the aircraft landing gear 10 to the crew, e.g. the pilot, of the aircraft 1. The steering angle, or the information indicative of the steering angle, is displayed in the cockpit 4 of the aircraft 1 such that it is easily available to the pilot. In this way, the pilot is informed of the steering angle of the aircraft landing gear even if the aircraft landing gear is not in their direct sight. This may help the pilot with maneuvering the aircraft 1 on the ground.

The determined steering angle of the aircraft landing gear 10 is used to limit further movement/rotation of the aircraft landing gear 10. For example, if the steering angle of the aircraft landing gear 10 is determined to be at a maximum safe steering angle, the pilot is prevented from increasing the steering angle further. The pilot may also receive a warning or other feedback when the maximum steering angle is reached. In some examples, when the pilot is using a physical input to control the steering angle, physical feedback through the input, e.g. shaking of the input, may be provided to the pilot to indicate when the maximum steering angle is reached.

In some examples, the information indicative of the steering angle of the aircraft landing gear 10 is provided to the crew of the aircraft 1 while the aircraft 1 is not on the ground. This information may be used to determine whether the aircraft landing gear 10 is in the correct position/orientation for landing and/or cruise. This may allow the crew to make an informed decision on whether it is safe to continue with landing and/or continued flight.

In some examples, the determined steering angle is stored, for example on the memory of the aircraft 1. Additionally or alternatively, the determined steering angle is stored on a database accessible by the aircraft 1, for example a database remote from the aircraft 1. In this way, the determined steering angle can be used to aid future steering angle determination or can be reviewed post flight to determine and analyse the accuracy of the method 100. As such, improvements can be made to the method 100 from a review of previously determined steering angles.

In some examples, any one or more of the steps of performing 102 image pre-processing, determining 103 the region of disinterest, applying 104 the mask, applying 105 the threshold, determining 106 the region of interest and/or providing 110 information may be omitted from the method 100.

Although the method 100 utilises edge detection in determining the steering angle of the aircraft landing gear 10, in some examples another form of feature detection may be used. For example, corner detection (where corners in an image are detected) or ridge detection (where ridges in an image are detected) may be used.

As the method 100 relies on the detection of edges of the component of the aircraft landing gear 10, it may be more difficult to carry out this method 100 when the component is partially occluded from the camera 15. An additional method 200 of determining the steering angle of the aircraft landing gear 10 which is not as affected by occlusion is shown in FIG. 6.

Figure 6:
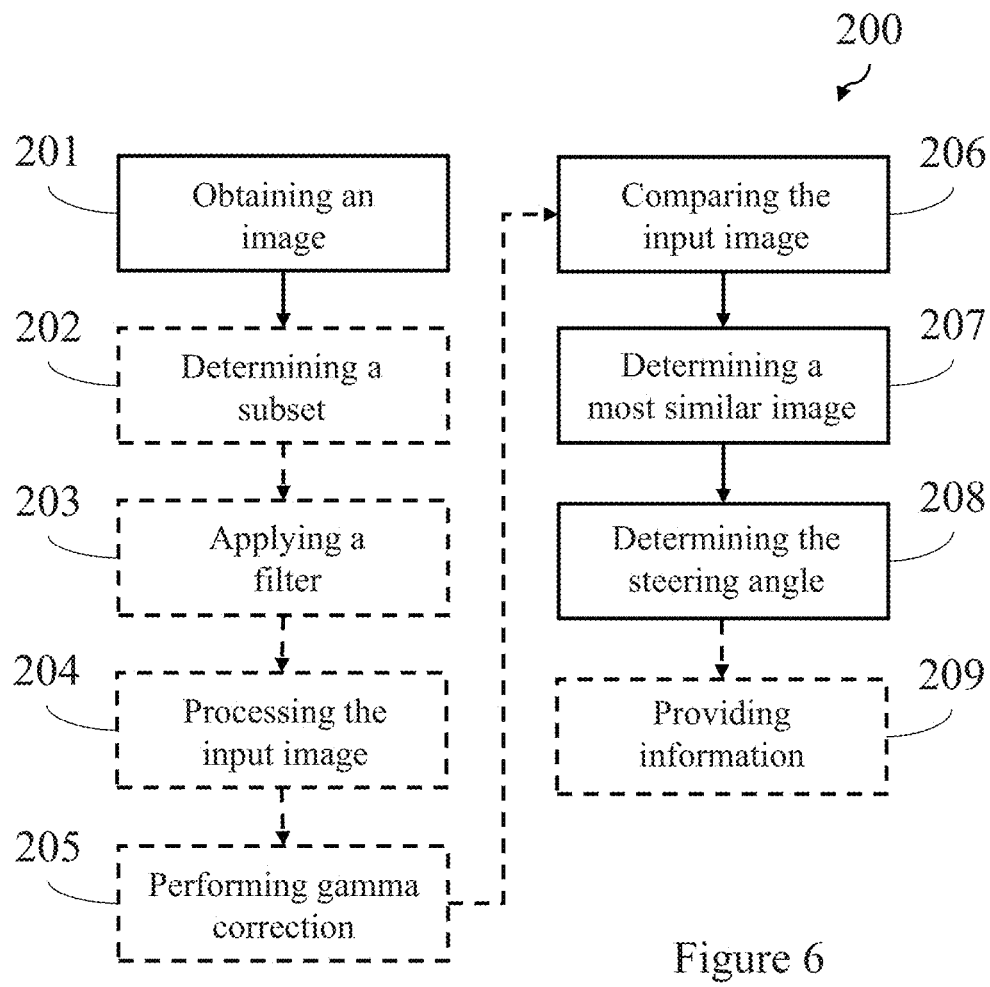
FIG. 6 shows a flow diagram of another method of determining the steering angle of the aircraft landing gear.

FIG. 6 shows a flow chart of a further method 200 of determining a steering angle of an aircraft landing gear 10. The method 200 is a computer-implemented method 200 of determining the steering angle of the aircraft landing gear 10. The method 200 is carried out by the aircraft controller 5 and comprises obtaining 201 an input image of the aircraft landing gear 10 and comparing 206 the input image against a plurality of reference images, e.g. a set of reference images or database of reference images. The plurality of reference images comprises images of the aircraft landing gear 10 at known steering angles. The method 200 comprises determining 207 a most similar reference image, where the most similar reference image comprises the reference image of the plurality of reference images most closely matched to the input image, and determining 208, based at least in part on the most similar reference image, the steering angle of the aircraft landing gear 10.

Figure 7:
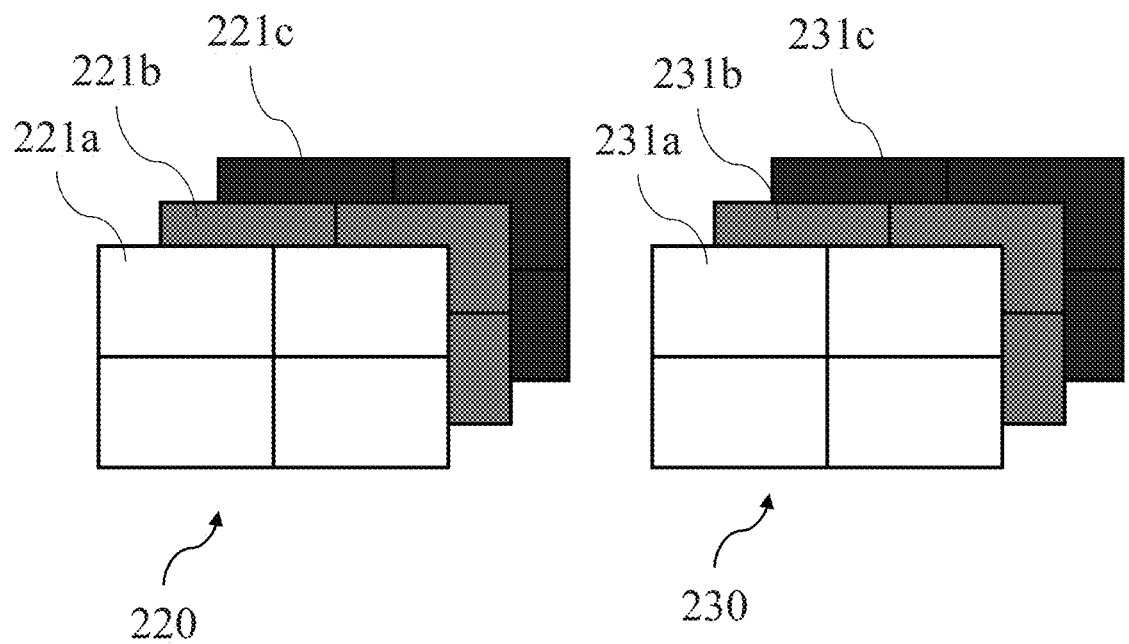
FIG. 7 shows schematic views of an input image and a reference image of the method of FIG. 6.

FIG. 7 shows a schematic illustration of the input image 220 and a reference image 230 of the plurality of reference images 230. In FIG. 7, the input image 220 and the reference image 230 are shown split into their respective red 221a, 231a, green 221b, 231b and blue 221c, 231c component planes.

Before the input image 220 is compared against the plurality of reference images 230, the method 200 comprises determining 202 a subset of the plurality of reference images 230 to be compared against the input image 220. The subset is determined based on a previous determination of the steering angle of the aircraft landing gear 10. As the steering angle will not be expected to have changed significantly from the previous determination, the subset can be focused near to the previously determined steering angle to reduce the number of comparisons that are needed to be made. For example, when the steering angle has previously been determined to be at +20° (i.e. 20° clockwise, as viewed from above, such that the aircraft 1 would turn to the right when moving forward), the subset comprises reference images 230 which have steering angles within a predefined range of this steering angle. For example, when the predefined range is 10°, the subset will include the reference images 230 with a steering angle of between +10° and +30°. Alternatively, the predefined range may be 5°, 15°, 20°, 25°, 30° or any other suitable range. Although the subset is determined after the input image 220 has been obtained in FIG. 6, in some examples, the subset is determined before the input image 220 is obtained.

As the input image 220 obtained by the method 200 may not be in optimal condition to be compared against the plurality of reference images 230, the input image 220 is modified to help to address this. For example, the input image 220 may contain excess noise which should be removed/reduced to improve the subsequent comparison. Therefore, after the input image is obtained, the method 200 comprises applying 203 a filter to the input image 220 to greyscale the image and processing 203 the input image to remove background noise from the input image. To grayscale the input image 220, each pixel of the input image 220 is converted to a shade of grey based on the brightness/luminance of the pixel. To remove noise from the input image 220, a smoothing filter, such as a Gaussian smoothing, is applied to the input image 220.

When the input image 220 is captured, the brightness (or perceived brightness) of the input image 220 may be inconsistent with the brightness of each of the plurality of reference images 230. For example, where the input image 220 is captured at night, and the plurality of reference images were captured in daylight, there will be a difference in light levels between the images. Where the input image 220 is too dark, this may obscure features of the input image 220 which are to be compared with the reference images 230. To help to address this, the method 200 comprises performing 205 gamma correction on the input image 220. The gamma correction is based on the gamma level of the plurality of reference images 230 and may help to improve the consistency of gamma levels between the input image 220 and the plurality of reference images 230. This may help to increase the accuracy of the comparison of the input image 220 against the plurality of reference images 230. The gamma correction may take the form as discussed in relation to the method of FIG. 4 above.

In some examples, both the input image 220 and the plurality of reference images 230 are processed in the same way. The processing may comprise at least one of masking, histogram matching, cropping, blurring, contrast limited adaptive histogram matching, sharpening and denoising.

To mask the input image 220 and the plurality of reference images 230, reference images in the plurality of reference images 230 are compared against each other to determine how much corresponding pixels (and their pixel values) change between different reference images 230. Where a pixel value changes by less than a predetermined threshold value, those pixels are determined to be part of the background of the reference image 230 and are therefore not relevant to the determination of steering angle of the aircraft landing gear 10. The pixels which are determined to be part of the background are then masked from the input image 220 and the plurality of reference images 230.

Histogram matching comprises modifying the input image 220 such that a histogram of the input image 220 matches a histogram of the plurality of reference images 230. In some examples, the input image 220 and the plurality of reference images 230 are modified such that the histograms of the input image 220 and the plurality of reference images 230 match a predetermined histogram. Alternatively, contrast limited adaptive histogram matching may be used to match the histogram of the input image 220 and the histogram of the plurality of reference images 230.

As only a portion of the input image 220 and the plurality of reference images 230 (such as a portion containing the aircraft landing gear 10) may be of interest when determining the steering angle, in some examples, the input image 220 and the plurality of reference images 230 may be cropped to only include a predetermined steering region. The steering region is a region within the input image 220 and the plurality of reference images 230 which includes the parts of the aircraft landing gear 10 that move when the steering angle changes.

In some examples, the input image 220 and the plurality of reference images 230 are smoothed by blurring. Blurring of the input image 220 and the plurality of reference images 230 is achieved by convolving the images with a low-pass filter kernel. The blurring may comprise averaging, Gaussian blurring, median blurring and/or bilateral filtering.

To sharpen the input image 220 and the plurality of reference images 230, in some examples, a sharpening kernel, such as that shown below, is applied to the input image 220 and each reference image 230 of the plurality of reference images 230.

$$\begin{bmatrix} 0 & -1 & 0 \\ -1 & 5 & -1 \\ 0 & -1 & 0 \end{bmatrix}$$

In some examples, denoising the input image 220 and/or the plurality of reference images 230 comprises applying a non-local means denoising algorithm to the input image 220 and/or the plurality of reference images 230. Non-local means denoising comprises replacing the colour of an individual pixel in an image with an average of colours of similar pixels within the image.

After the input image 220 has been modified as desired, the method 200 comprises comparing 206 the input image 220 against the subset of the plurality of reference images 230 and determining 207 a most similar reference image 230. The most similar reference image 203 is the reference image 230 of the plurality of reference images 230 most closely matched to the input image 220. Comparing 206 the input image 220 against the plurality of reference images 230 comprises comparing input image pixel values of the input image 220 against corresponding reference image pixel values of each of the plurality of reference images 230. If a suitable match (i.e. a reference image 230 having a similarity characteristic within a predetermined threshold of the input image 220) is not found in the subset, the subset is expanded to include additional reference images 230 until a suitable match is found.

In FIG. 7, the input image pixel values and the reference image pixel values comprise information indicative of the colours of pixels in the input image 220 and reference images 230 respectively. The input image 220 and the reference image 230 each comprise a red component value 221a, 231a, a green component value 221b, 231b and a blue component value 221c, 231c. When comparing the input image 220 against the reference image 230, the values and/or relative values of the red, green and/or blue component values of the individual pixels are compared. To do this, the method 200 comprises calculating a similarity metric between the input image 220 and the reference image 230. In this case, the method comprises calculating the root mean square deviation (RMSD) between the input image pixel values and the corresponding reference image pixel values. This calculation is carried out for each of the reference images 230 in the subset, and the reference image 230 with the smallest RMSD between the input image pixel values and the reference image pixel values is determined to be the most similar reference image 230. In some examples, a different similarity metric is calculated. For example, the similarity metric may comprise the total number of pixel values in common between the input image 220 and the reference image 230. A respective similarity metric for each reference image may be determined and the reference image 230 with the similarity metric closest to a threshold value may be determined, wherein the threshold value is indicative of the highest degree of similarity. Another similarity metric which may be used is a cosine similarity. In some examples, the input image pixel values are transformed into a one-dimensional input image vector and the reference image pixel values are transformed into a one-dimensional reference image vector. The cosine similarity between the input image vector and the reference image vector is then calculated. This calculation is carried out for each of the reference images 230 in the subset, and the reference image 230 with the greatest cosine similarity between the input image vector and the reference image vector is determined to be the most similar reference image 230.

Although the components of the colours of the pixels are compared in the method of FIG. 6, in some examples, such as when the input image 220 and the reference images 230 are not in colour, the input image pixels values and the reference image pixel values may comprise the intensity of the relevant pixels. The most similar reference image 230 is then the reference image 230 with the most pixels having the same or similar intensity as in the input image 220.

It is also possible to use machine learning to determine the most similar reference image 230. For example, determining 207 the most similar reference image 230 may comprise utilising a machine learning algorithm. The machine learning algorithm may comprise the input image 220 as an input, and the most similar reference image 230 as an output. Such a machine learning algorithm may be trained to provide its output based on a set of training data, for example a set of training data labelled with ground truth values in a supervised learning process. For example, the plurality of reference images 230 at known steering angles may be used to train the machine learning algorithm. In another example, measured data may form a training data set. In some examples, the machine learning algorithm may be updated in real-time based on data obtained by the aircraft 1, or other aircraft of the same type. In some examples, the machine learning algorithm may comprise a neural network.

Based at least in part on the most similar reference image 230, the method 200 comprises determining 208 the steering angle of the aircraft landing gear 10. As the steering angle of each of the reference images 230 is known, the steering angle of the most similar reference image 230 is determined to be the steering angle of the aircraft landing gear 10.

Once the steering angle has been determined, the method 200 comprises providing 209 information indicative of the steering angle of the aircraft landing gear 10 to the crew, e.g. the pilot, of the aircraft 1. The steering angle, or the information indicative of the steering angle, is displayed in the cockpit 4 of the aircraft 1 such that it is easily available to the pilot. In this way, the pilot is informed of the steering angle of the aircraft landing gear even if the aircraft landing gear is not in their direct sight. This may help the pilot with maneuvering the aircraft 1 on the ground.

The determined steering angle of the aircraft landing gear 10 is used to limit further movement/rotation of the aircraft landing gear 10. For example, if the steering angle of the aircraft landing gear 10 is determined to be at a maximum safe steering angle, the pilot is prevented from increasing the steering angle further. The pilot may also receive a warning or other feedback when the maximum steering angle is reached. In some examples, when the pilot is using a physical input to control the steering angle, physical feedback through the input, e.g. shaking of the input, may be provided to the pilot to indicate when the maximum steering angle is reached.

In some examples, the information indicative of the steering angle of the aircraft landing gear 10 is provided to the crew of the aircraft 1 while the aircraft 1 is not on the ground. This information may be used to determine whether the aircraft landing gear is in the correct position/orientation for landing and/or cruise. This may allow the crew to make an informed decision on whether it is safe to continue with landing and/or continued flight.

In some examples, the determined steering angle is stored, for example on the memory of the aircraft 1. Additionally or alternatively, the determined steering angle is stored on a database accessible by the aircraft, for example a database remote from the aircraft 1. In this way, the determined steering angle can be used to aid future steering angle determination or can be reviewed post flight to determine and analyse the accuracy of the method 100. As such, improvements can be made to the method 100 from a review of previously determined steering angles.

Although the method 200 as described above compares the input image 220 against the subset of the plurality of reference images 230, in some examples the method 200 compares the input image 220 against all of the plurality of reference images 230. The plurality of reference images 230 comprises a series of images of the aircraft landing gear 10 where there is an interval of between 10° and 0.5° of steering angle between each image. In some examples, the interval may be between 8° and 0.5°, 6° and 0.5°, 4° and 0.5°, 2° and 0.5°, or 1° and 0.5°. The plurality of reference images covers a total range of steering angles of the aircraft landing gear 10 of 140°, i.e. between −70° (70° to the left) and +70° (70° to the right). In some examples, the total range is between 100° and 180°, between 120° and 160° or between 130° and 150°. In some examples, other ranges are also possible.

The plurality of reference images 230 are generated by capturing images of the aircraft landing gear 10 while at the same time receiving information indicative of the steering angle of the aircraft landing gear 10. The images and their corresponding steering angles are saved to the memory, along with a mapping between the reference image 230 and the corresponding steering angle. In some examples, the information indicative of the steering angle is determined by a sensor, e.g. a rotary variable differential transformer (RVDT), on the aircraft landing gear 10.

Figure 8:
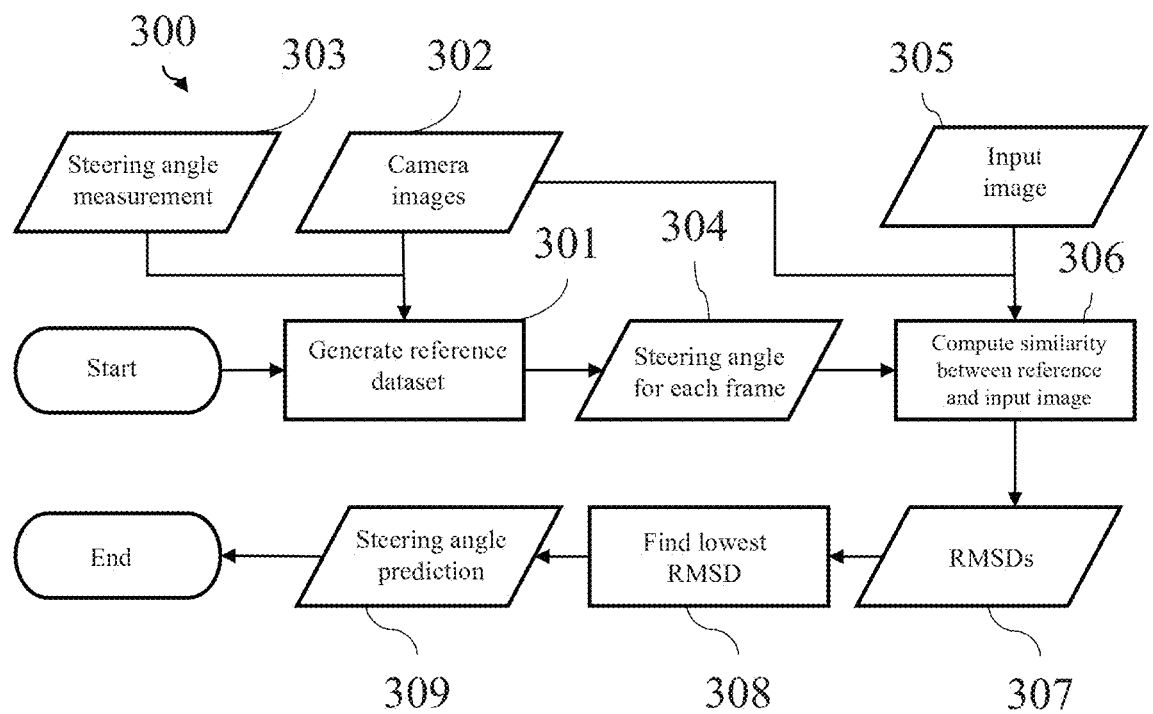
FIG. 8 shows a flow diagram of another method of determining the steering angle of the aircraft landing gear.

The plurality of reference images 230 are stored on the memory of the aircraft 1. In this way, the plurality of reference images 230 can be quickly accessed by the method 200. In some examples, the reference images are stored on a database accessible by the aircraft 1, such as a database remote from the aircraft 1. This may allow multiple aircraft 1 to access the plurality of reference images 230 and may also allow the plurality of reference images 230 to be updated at a central location, rather than having to update the memory of each aircraft 1 individually An implementation of the method 200 is further illustrated in the flow chart 300 of FIG. 8. A reference dataset (e.g. a plurality of reference images) is generated (box 301) by capturing images (box 302) of the aircraft landing gear with the camera while measuring 303 (box 303) the steering angle of the aircraft landing gear 10 and mapping the images to the corresponding measured steering angle, such that the steering angle of each frame captured by the camera is known (box 304). An input image 220 (box 305) from the camera is compared against the reference dataset to compute similarities (box 306). From this, the RMSD of each image in the reference dataset compared to the input image 220 is calculated (box 307). The reference image with the lowest associated RMSD is found (box 308) and is used to predict (box 309) the steering angle of the input image 220 and therefore the aircraft landing gear 10.

In some examples, any one or more of the steps of determining 202 the subset, applying 203 the filter, processing 204 the input image, performing 205 the gamma correction and/or providing 209 information may be omitted from the method 200.

Figure 9:
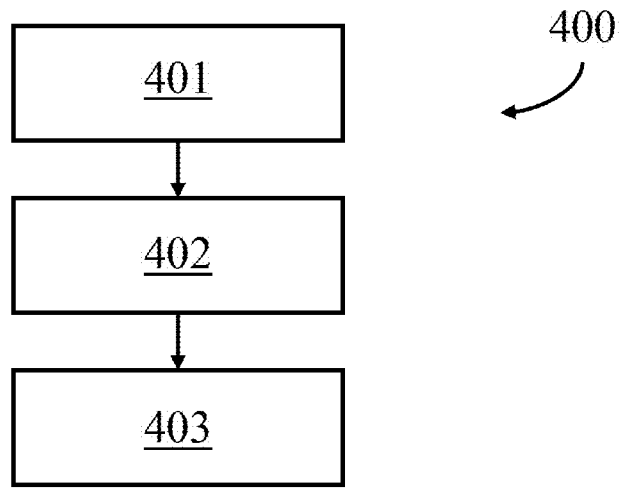
FIG. 9 shows a flow diagram of another method of determining the steering angle of the aircraft landing gear.

As discussed above, the method 200 of FIG. 6 may work better in certain situations than the method 100 of FIG. 4. As such, it is advantageous to be able to select between the two methods 100, 200 when attempting to determine the steering angle of an aircraft landing gear 10. This may allow the best method 100, 200 to be used for the given conditions. FIG. 9 shows a flow chart of such a method 400 of determining a steering angle of the aircraft landing gear 10. The method 400 comprises determining 401 a condition affecting the aircraft landing gear 10. The condition is a determination of whether the tyre 11 of the aircraft landing gear is occluded from the camera. In other examples, the condition may be another condition affecting the determination of the steering angle of the aircraft landing gear 10, such as a weather condition and/or an operation status of the imaging device 15.

The method 400 comprises selecting 402 a first mode of determining the steering angle of the aircraft landing gear 10 or a second mode determining the steering angle of the aircraft landing gear 10, based at least in part on the condition. The first mode is the method 100 as described in relation to FIG. 4 and the second mode is the method 200 as described in relation to FIG. 6. As such, the optimal or preferred method for determining the steering angle of the aircraft landing gear 10 given the condition can be selected. Once the mode has been selected, the method 400 comprises determining 403 the steering angle of the aircraft landing gear 10 using the selected mode.

As the first and second modes (and the methods 100, 200) are different method of determining the steering angle of the aircraft landing gear 10, the first and second modes may have different failure conditions. As such, when one of the modes/methods is not working as desired, the other mode/method can be selected. By being able to expressly select the first or second mode, the optimal mode can be selected without having to rely on any other input/information. For example, it is not necessary for one of the modes to fail before the other mode is used.

Although in the above example the first mode is the method 100 as described in relation to FIG. 4 and the second mode is the method 200 as described in relation to FIG. 6, in other examples the first mode and/or the second mode may comprise another method of determining the steering angle of the aircraft landing gear 10. The first mode and/or the second mode may comprise using a sensor, such as a rotary variable differential transformer (RVDT), to determine the steering angle of the aircraft landing gear 10, or may comprise using another suitable form of computer vision to determine the steering angle of the aircraft landing gear 10.

Figure 10:
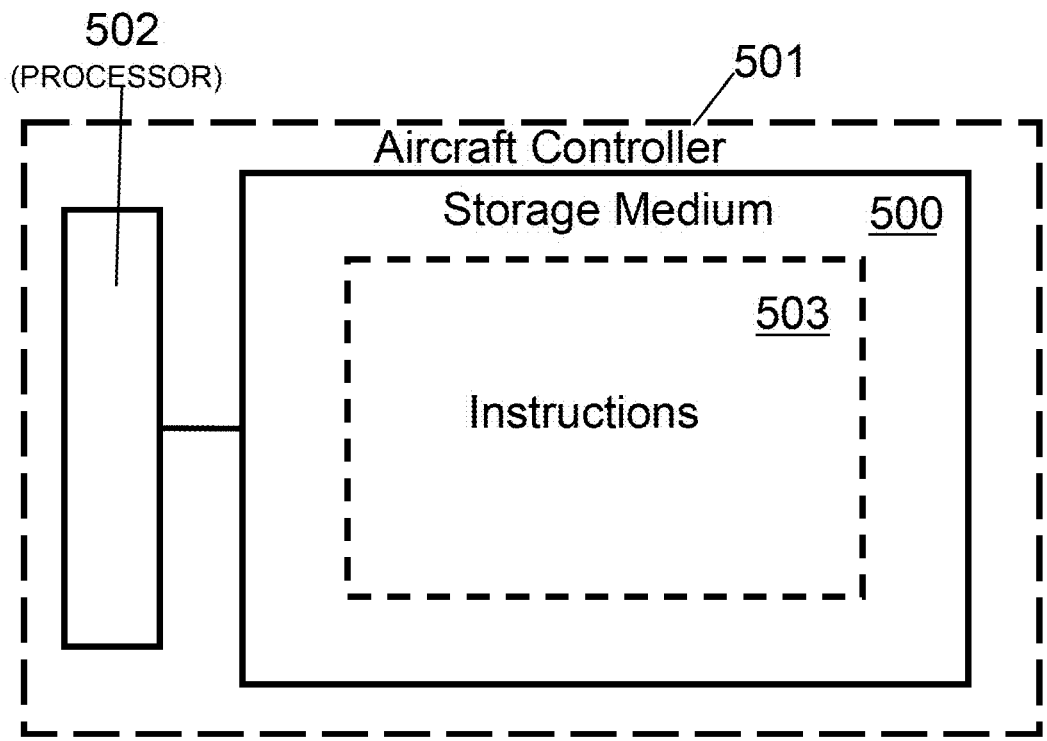
FIG. 10 shows a schematic diagram of a non-transitory computer-readable medium.

FIG. 10 shows a schematic diagram of a non-transitory computer-readable storage medium 500 according to an example. The non-transitory computer-readable storage medium 500 stores instructions 503 that, if executed by a processor 502 of an aircraft controller 501, cause the processor 502 to perform one of the methods described herein. In some examples, the aircraft controller 501 is the aircraft controller 5 described above with reference to FIG. 1 or a variant thereof described herein. The instructions 503 may comprise instructions to perform any of the methods 100, 200, 400 described above with reference to FIGS. 4 to 9 or variants thereof, such as those discussed herein.

Any step or feature discussed in relation to one of the methods 100, 200, 400 discussed herein may be used in combination with the steps and features of any other method 100, 200, 400 discussed herein.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method of determining a steering angle of an aircraft landing gear, the method comprising:
    obtaining an input image of the aircraft landing gear by capturing the input image with an imaging device positioned on a strut of the aircraft landing gear and directly above a tire of the aircraft landing gear when the aircraft landing gear is extended;
    comparing the input image against a plurality of reference images, the plurality of reference images comprising images of the aircraft landing gear at known steering angles;
    determining a most similar reference image, the most similar reference image comprising a reference image of the plurality of reference images most closely matched to the input image; and
    determining, based at least in part on the most similar reference image, the steering angle of the aircraft landing gear.

2. The computer-implemented method according to claim 1, wherein the comparing the input image against the plurality of reference images comprises comparing input image pixel values against corresponding reference image pixel values of each of the plurality of reference images.

3. The computer-implemented method according to claim 2, wherein the comparing the input image pixel values against the corresponding reference image pixel values comprises calculating the root mean square deviation (RMSD) between the input image pixel values and the corresponding reference image pixel values.

4. The computer-implemented method according to claim 3, wherein the determining the most similar reference image comprises determining the reference image with the smallest root mean square deviation between the input image pixel value and the corresponding reference image pixel value.

5. The computer-implemented method according to claim 1, comprising determining a subset of the plurality of reference images to be compared against the input image and comparing the input image against the subset.

6. The computer-implemented method according to claim 5, wherein the determining the subset comprises determining the subset based on a previous determination of the steering angle of the aircraft landing gear.

7. The computer-implemented method according to claim 1, further comprising:
determining a region of interest of the image, the region of interest comprising part of the image in which a component of interest of the aircraft landing gear is expected to be located in normal operation,
wherein the comparing the input image against the plurality of reference images comprises comparing the region of interest against the plurality of reference images.

8. The computer-implemented method according to claim 1, further comprising processing the input image to remove background noise from the input image.

9. The computer-implemented method according to claim 1, further comprising applying a filter to the input image to greyscale the image.

10. The computer-implemented method according to claim 1, further comprising performing gamma correction on the input image.

11. The computer-implemented method according to claim 1, wherein the plurality of references images are generated by capturing images of the aircraft landing gear while receiving information indicative of the steering angle of the aircraft landing gear, and saving the images and the corresponding steering angle to a memory.

12. An aircraft controller comprising:
a non-transitory computer-readable storage medium storing instructions, and
a processor which executes the instructions to:
obtain an image of an aircraft landing gear by capturing the input image with an imaging device positioned on a strut of the aircraft landing gear and directly above a tire of the aircraft landing gear when the aircraft landing gear is extended;
compare the input image against a plurality of reference images, the plurality of reference images comprising images of the aircraft landing gear at known steering angles;
determine a most similar reference image, the most similar reference image comprising the reference image of the plurality of reference images most closely matched to the input image; and
determine, based at least in part on the most similar reference image, the steering angle of the aircraft landing gear.

13. A system for determining a steering angle of an aircraft landing gear, the system comprising:
an imaging device positioned on a strut of the aircraft landing gear and directly above a tire of the aircraft landing gear when the aircraft landing gear is extended, and;
an aircraft controller configured to:
obtain an image of an aircraft landing gear from the imaging device;
compare the input image against a plurality of reference images, the plurality of reference images comprising images of the aircraft landing gear at known steering angles;
determine a most similar reference image, the most similar reference image comprising the reference image of the plurality of reference images most closely matched to the input image; and
determine, based at least in part on the most similar reference image, the steering angle of the aircraft landing gear.

14. The system according to claim 13, wherein the imaging device comprises a first imaging device and a second imaging device.

15. The system according to claim 14, wherein the first imaging device and the second imaging device are different types of imaging device.

16. The system according to claim 15, wherein the first imaging device comprises a lidar sensor and the second imaging device comprises a camera.

17. A method of determining a steering angle of an aircraft landing gear, the method comprising:
capturing an input image with an imaging device positioned on a strut of the aircraft landing gear and directly above a tire of the aircraft landing gear when the aircraft landing gear is extended;
determining a condition affecting the aircraft landing gear, wherein the determination is based on the input image;
selecting, based at least in part on the condition, a first mode of determining the steering angle of the aircraft landing gear or a second mode of determining the steering angle of the aircraft landing gear; and
determining the steering angle of the aircraft landing gear using the selected mode,
wherein the steering angle is determined in the first mode by detecting at least one edge of the tire as shown in the input image and determining the steering angle based on a relative angular position of the edge in the input image, and
wherein the steering angle is determined in the second mode by comparing the input image to reference images of the aircraft landing gear each corresponding to a respective known steering angle, selecting a most similar reference image of the reference images and using the most similar reference image to determine the steering angle.

18. A method of determining an aircraft steering angle, the method comprising:
capturing an input image with an imaging device positioned on a strut of the aircraft landing gear and directly above a tire of the aircraft landing gear when the aircraft landing gear is extended
obtaining image information of the input image of the aircraft landing gear;
comparing the image information of the input image against a database of image information of the aircraft landing gear at known steering angles; and
determining, based at least in part on the image information of the aircraft landing gear at known steering angles, the steering angle of the aircraft landing gear.

19. A non-transitory computer-readable storage medium storing instructions that, when executed by an aircraft controller, cause the aircraft controller to carry out the method according to claim 1.

20. An aircraft comprising the aircraft controller according to claim 12.

* * * * *